United States Patent [19]

Robins

[11] Patent Number: 4,460,759
[45] Date of Patent: Jul. 17, 1984

[54] ADHESIVE COMPOSITIONS AND BONDING METHODS EMPLOYING THE SAME

[75] Inventor: Janis Robins, St. Paul, Minn.

[73] Assignee: Minnesota Mining & Manufacturing Company, St. Paul, Minn.

[21] Appl. No.: 323,400

[22] Filed: Nov. 20, 1981

[51] Int. Cl.$^3$ .............................................. C08F 20/34
[52] U.S. Cl. .................................. 526/298; 156/331.2
[58] Field of Search ........................................ 526/298

[56] References Cited

U.S. PATENT DOCUMENTS

| | | | |
|---|---|---|---|
| 2,768,109 | 10/1956 | Coover, Jr. | 154/133 |
| 3,260,637 | 7/1966 | von Bramer | 156/314 |
| 3,640,072 | 2/1972 | Bolger | 106/68 |
| 3,836,377 | 9/1974 | Delahunty | 106/287 |
| 3,903,055 | 9/1975 | Buck | 526/298 |
| 3,940,362 | 2/1976 | Overhults | 526/298 |
| 4,012,402 | 3/1977 | Buck | 526/298 |
| 4,042,442 | 8/1977 | Dombroski et al. | 156/310 |
| 4,170,585 | 10/1979 | Motegi et al. | 260/33.2 R |
| 4,171,416 | 10/1979 | Motegi et al. | 526/245 |
| 4,215,173 | 7/1980 | Hubbard | 428/331 |
| 4,307,216 | 12/1981 | Shiraishi et al. | 526/298 |
| 4,321,180 | 3/1982 | Kimura et al. | 526/298 |

FOREIGN PATENT DOCUMENTS 56-47474   4/1981   Japan .

OTHER PUBLICATIONS

E. F. Donnelly et al., "Ionic and Zwitterionic Polymerization of n-alkyl 2-cyaroacrylates", *Plymer Letters Edition*, vol. 15, pp. 399–405, (1977).

D. C. Pepper, "Anionic and Zwitterionic Polymerization of d-cyaroacrylates", *Journal of Polymer Science: Polymer Symposium*, 62.65–77, (1978).

*Primary Examiner*—Harry Wong, Jr.

*Attorney, Agent, or Firm*—Donald M. Sell; James A. Smith; Robert W. Sprague

[57] ABSTRACT

An adhesive composition comprising an adhesive base and accelerator portion, the adhesive base comprising (a) a polymerizable monomer selected from the group consisting of unsubstituted alpha-cyanoacrylates and substituted alpha-cyanoacrylates; and (b) an effective amount of stabilizer; and the accelerator portion comprising a weakly acidic or weakly basic ionic accelerator compound comprising a cation M and an anion A, the pKa relating to cation M in the equilibrium defined by

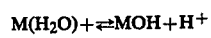

$$M(H_2O)+ \rightleftharpoons MOH+H^+$$

being at least about 10, the pKa relating to anion A in the equilibrium defined by

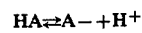

$$HA \rightleftharpoons A^- + H^+$$

being less than or equal to about 0, and the nucleophilicity constant of anion A being less than about 2 when cation M is an onium cation comprising more than 8 carbons, the nucleophilicity constant being determined relative to methyl iodide; the adhesive composition being further characterized in that it exhibits a set time of less than ⅓ that of the adhesive base alone and provides a bond which exhibits an overlap shear value of at least about 400 pounds per square inch. These adhesive compositions exhibit suitable cure rates when employed on wooden substrates and result in strong bonds which age well in the presence of heat and moisture. Methods of bonding wooden substrates using weakly acidic or weakly basic ionic accelerator compounds are also described herein.

11 Claims, No Drawings

ADHESIVE COMPOSITIONS AND BONDING METHODS EMPLOYING THE SAME

BACKGROUND OF THE INVENTION

This invention relates to cyanoacrylate adhesive compositions and bonding methods using the same.

One bonding application in which cyanoacrylate adhesives are particularly useful is the bonding of wood. Since cyanoacrylate adhesives have a tendency to cure slowly on wood substrates due to the acidic nature of such substrates, use has been made of an accelerator to accelerate cure to satisfactory rates. Depending on the properties of the specific accelerator employed, the accelerator may be either included as an ingredient in a one-part alpha-cyanoacrylate adhesive composition or employed as a primer which is applied to at least one of the substrates during the bonding operation itself. Specific examples of conventional accelerators which have been employed are the alcohols, described in U.S. Pat. No. 2,768,109 (Coover); the organic amines disclosed in U.S. Pat. No. 3,260,637 (Von Bramer); the imino- or unsaturated aliphatically substituted derivatives of s-triazine, hexahydro-s-triazine and pyrimido [5,4-d] pyrimidine disclosed in U.S. Pat. No. 3,640,972 (Bolgar); the compounds containing N—C=S or N=C—S— groups disclosed in U.S. Pat. No. 3,836,377 (Delahunty); caffeine and theobromine as disclosed in U.S. Pat. No. 4,042,442 (Dombroski et al.); the polyethylene glycols and non-ionic surface agents comprising a poly(ethyleneoxy) moiety as disclosed in U.S. Pat. No. 4,170,585 (Motegi et al.); macrocyclic polyether compounds such as 18-crown-6 or 15-crown-5 as disclosed in U.S. Pat. No. 4,171,416 (Motegi et al.); and sodium hydroxide, potassium hydroxide and sodium-borosilicate as disclosed in U.S. Pat. No. 4,215,173 (Hubbard). The strongly basic or alkaline accelerators such as sodium hydroxide cause rapid polymerization of an alpha-cyanoacrylate composition on mixing and therefore are necessarily employed as primers.

Certain disadvantages may accompany the use of the strongly basic or alkaline ionic accelerators (e.g., sodium hydroxide and potassium hydroxide) in bonding operations involving wooden substrates. In particular, loss in overlap shear strength of the resulting adhesive bond may occur when the accelerator is employed with a 10 second open time (i.e., the time elapsed between the application of the accelerator to a wood substrate and the placing of the wood substrates in an abutting relationship during formation of the adhesive bond). Such loss in bond strength may be particularly evident when the adhesive bond is exposed to moisture and heat.

SUMMARY OF THE PRESENT INVENTION

The present invention provides novel adhesive compositions comprising an adhesive base and an accelerator portion, the adhesive base comprising (a) a polymerizable monomer selected from the group consisting of unsubstituted alpha-cyanoacrylates and substituted alpha-cyanoacrylates; and (b) a sufficient amount of a stabilizer; and the accelerator portion comprising a weakly acidic or weakly basic ionic accelerator compound comprising a cation M and an anion A, the pKa relating to the cation M in the equilibrium defined by $$M(H_2O)^+ \rightleftharpoons MOH + H^+$$

being at least about 10, the pKa relating to the anion A in the equilibrium defined by $$HA \rightleftharpoons A^- + H^+$$

being less than or equal to about 0, and the nucleophilicity constant of anion A being less than about 2 when cation M is an onium cation comprising more than 8 carbons, the nucleophilicity constant being determined relative to methyl iodide; the adhesive composition being further characterized in that it exhibits a set time of less than ⅛ that of the adhesive base alone and provides a bond which exhibits an overlap shear value of at least about 400 pounds per square inch. The present invention also provides novel methods for bonding wood substrates using adhesive compositions comprising weakly acidic or weakly basic ionic accelerator compounds.

It has now been found that employment of a weakly acidic or weakly basic ionic compound as the accelerator compound in the two-part, alpha-cyanoacrylate adhesive compositions described herein provides adhesive compositions which exhibit satisfactory rates of cure on wood substrates. It has also been found that the adhesive compositions described herein, since they include a weakly acidic or weakly basic ionic compound as an accelerator compound, may be employed in bonding wood substrates using an open time of 10 seconds (relative to the accelerator compound) and still provide an adhesive bond which exhibits suitable resistance to moisture and heat.

The adhesive compositions and methods of the present invention may be suitably employed in the bonding of a variety of wood substrates (e.g., walnut, ash, fir, oak, maple, pine, and birch substrates).

DETAILED DESCRIPTION OF THE PRESENT INVENTION

The adhesive bases of the adhesive compositions of the present invention comprise a polymerizable monomer. The polymerizable monomer may be an unsubstituted or a substituted alpha-cyanoacrylate monomer.

Preferred monomers for use as the polymerizable monomer are unsubstituted alpha-cyanoacrylates of the formula $$CH_2=C(CN)-COOR^1 \qquad (I)$$

wherein:
$R^1$ is selected from the group consisting of alkyl groups of 1 to about 10 carbons and alkenyl groups of 2 to about 10 carbons.

Illustrative of the alkyl groups which $R^1$ may represent in formula I above are methyl, ethyl, n-propyl, isopropyl, n-butyl, and isobutyl groups. Illustrative of the alkenyl groups which $R^1$ may represent are vinyl and allyl radicals. The preferred alpha-cyanoacrylate is ethyl cyanoacrylate.

Examples of suitable substituted alpha-cyanoacrylate monomers for use as the polymerizable monomer are the 1,1-disubstituted butadienes-1,3 and 1,1-disubstituted-1-butene-3-ynes disclosed in U.S. Pat. No. 3,316,227 (Gerber), incorporated herein by reference, and the alkenyl esters or alkoxy substituted alkyl esters of 2-cyanopenta-2,4-dienoic acid disclosed in U.S. Pat. No. 3,554,990 (Quinn et al.), incorporated herein by reference.

The adhesive bases may comprise a single type of polymerizable monomer or may comprise a mixture of two or more different types of polymerizable monomers.

In order to obtain adhesive bases exhibiting desirable shelf-life, it is generally desirable to include an effective amount of a stabilizer (i.e., an amount which provide an adhesive base which exhibits substantially no gelation when stored for at least about one month at 22° C., but which, at the same time, is capable of undergoing polymerization at a practical rate). Examples of stabilizers which are useful in the adhesive bases are anionic polymerization inhibitors and free-radical polymerization inhibitors. In many instances it may be desirable to include both an anionic polymerization inhibitor and a free-radical polymerization inhibitor.

Suitable anionic polymerization inhibitors are well-known to those skilled in the art and include acidic gases such as sulfur dioxide, sulfur trioxide, nitric oxide, and hydrogen fluoride; aromatic sulfonic acids and aliphatic sulfonic acids; and organic sultones of the type disclosed in U.S. Pat. No. 3,836,377 (Delahunty), incorporated herein by reference. Suitable amounts of the foregoing for inclusion in the adhesive base are as follows: a suitable amount of an acidic gas is from about 0.001 to 0.06 parts by weight per 100 parts by weight of the polymerizable monomer; a suitable amount of an aromatic or aliphatic sulfonic acid is from about 0.0005 to 0.1 parts by weight per 100 parts of the polymerizable monomer; and a suitable amount of a sultone is from about 0.1 to 10 parts by weight per 100 parts by weight of the polymerizable monomer.

Suitable free-radical polymerization inhibitors are also well-known to those skilled in the art and include hydroquinone, hydroquinone monomethyl ether, t-butyl catechol, and p-methoxy phenol. A suitable amount of a free-radical polymerization inhibitor is 0.0005 to 0.1 parts by weight and preferably 0.001 to 0.05 parts by weight, both per 100 parts by weight of the polymerizable monomer.

The above-described polymerizable monomers generally exhibit a low viscosity. In order to increase the viscosity of the adhesive base to desired levels, it may, therefore, be desirable to include a thickener therein. Suitable thickeners are well-known to those skilled in the art and include poly(methyl methacrylate), polymers comprising methacrylate and a monomer, acrylic rubbers, cellulose derivatives, polyvinyl acetate and poly(alpha-cyanoacrylate). It has been found in the present invention that adhesive bases comprising up to 40 parts by weight and preferably about 10 to 30 parts by weight of a thickener, both per 100 parts by weight of the polymerizable monomer, exhibit suitable viscosity for most bonding operations.

The adhesive bases may additionally comprise the plasticizers, perfumes, dyes, pigments and the like, which are well-known to those skilled in the art.

The accelerator portions comprise a weakly acidic or weakly basic ionic accelerator compound comprising a cation M and an anion A, the pKa relating to the cation M in the equilibrium defined by $$M(H_2O)^+ \rightleftharpoons MOH + H^+ \quad (II)$$

being at least about 10, and preferably at least about 13, and the pKa relating to the anion A in the equilibrium defined by $$HA \rightleftharpoons A^- + H^+ \quad (III)$$

being less than or equal to about 0, and preferably less than or equal to about −5. The above-described pKa relating to the cation M represents the dissociation constant of the first water molecule to dissociate.

It is to be understood that pKa may be determined by any of the known methods including potentiometric methods, spectrophotometric methods, and conductance methods. Reference is made to *Treatise on Analytical Chemistry*, I. M. Kolthoff and P. J. Elving, John Wiley and Sons, Vol. 2, Part 1, p. 239 (1979) for a discussion of these and other suitable methods of determining pKa. The methods selected and any modifications made to the selected method will depend on a variety of considerations such as the solubility of the particular compound comprising the cation or anion for which pKa is being determined. It is assumed that one of ordinary skill can select and, if necessary, modify a particular method in order to correctly determine the pKa of specific cations and anions for purposes of the present invention.

Specific examples of cations which M may be are included in Table I below. Table I also includes the pKa relating to those cations in the above-defined equilibrium (II).

TABLE I

| Cation M | pKa |
|---|---|
| K+ | 14.5[a] |
| Na+ | 14.2[a] |
| Cs+ | >13[b] |
| Li+ | 13.6[a] |
| Ba++ | 13.5[a] |
| Ca++ | 12.9[a] |
| Mg++ | 11.4[a] |
| Mn++ | 10.6[a] |

[a] as reported in The Hydrolysis of Cations, C. F. Base Jr. and R. E. Mesmer, John Wiley and Sons, 1976.
[b] estimate Still further examples of cations which cation M may be are onium cations such as quaternary ammonium cations. Examples of suitable quaternary ammonium cations which cation M may be are tetramethyl ammonium cation, tetraethyl ammonium cation, tetrapropyl ammonium cation, tetrabutyl ammonium cation, trimethylethyl ammonium cation, dimethyldiethyl ammonium cation, and trimethylbutyl ammonium cation. The pKa for the quaternary ammonium cations is estimated to be greater than 13.

Specific examples of anions which A may be are included in Table 2 below. Table II also includes the pKa relating to those anions in the above-defined equilibrium (III).

TABLE II

| Anion A | pKa |
|---|---|
| ClO$_4^-$ (perchlorate) | −10[a] |
| I$^-$ (iodide) | −9.5[a] |
| Br$^-$ (bromide) | −9[a] |
| Cl$^-$ (chloride) | −6[a] |
| ClO$_3^-$ (chlorate) | −2.7[a] |
| SCN$^-$ (thiocyanate) | −1.9[a] |
| NO$_3^-$ (nitrate) | −1.3[b] |
| $\phi$SO$_3^-$ (phenylsulfonate) | −1.0[a] |
| p-CH$_3\phi$SO$_3^-$ (methyl phenyl sulfonate) | −1.0[a] |
| CH$_3$SO$_3^-$ (methylsulfonate) | −0.6[a] |

TABLE II-continued

| Anion A | pKa |
|---|---|
| $CF_3CO_2^-$ (trifluoroacetate) | $-0.3^a$ |

[a] as reported in Lange's Handbook of Chemistry, 12th Ed., McGraw-Hill, Table 5-7.
[b] as reported in R. G. Pearson et al., J. Am. Chem. Soc. 90, 319 (1968)

Other examples which anion A may be are tetrafluoroborate ($BF_4^-$), and periodate ($IO_4^-$), the pKas for these anions being estimated to be less than about $-5$. Still further examples of anions which A may be are triflate ($CF_3SO_3^-$), hexafluorophosphate ($PF_6^-$), hexafluoroantimonate ($SbF_6^-$), and hexafluoroarsenate ($AsF_6^-$) anions, the pKas for these anions being estimated to be less than about $-5$.

The degree to which an ionic compound accelerates the cure of an alpha-cyanoacrylate monomer may depend, in part, on the mobility of the anion in the monomer. Accordingly, anion A preferably has a molecular weight of no more than about 250. Compounds such as sodium tridecylether sulfate (i.e., that available under the trade designation "Sipex EST 30" from Alcolac, Inc.) and sodium mono- or di- dodecyl disulfonate diphenyl oxide (i.e., that available under the trade designation "Dowfax 2A1 Solution" from Dow Chemical Co.) have been found not to accelerate significantly the cure of alpha-cyanoacrylate monomers.

It has also been found that the nucleophilicity constant of anion A should be considered (in addition to the pKas of cation M and anion A) in some instances in selecting a suitable onium cation as cation M. In particular, when the cation M is an onium cation comprising more than 8 carbon atoms (e.g., as is the case with tetrabutyl ammonium cation), the anion A should have a nucleophilicity constant (relative to methyl iodide) of less than about 2. Reference is made to R. G. Pearson, H. Sabel and J. Songstad, Journal of the American Chemical Society, 90, 319 (1968), incorporated herein by reference, for nucleophilicity constants of a variety of anions as determined relative to methyl iodide and for a method for determining such constants. It has been found in the present invention, for example, that suitable results are obtained when tetrabutyl ammonium perchlorate, tetrabutyl ammonium triflate, tetrabutyl ammonium hexafluorophosphate, and tetrabutyl ammonium hexafluoroarsenate are employed as the accelerator compounds, the perchlorate, triflate, hexafluorophosphate and hexafluoroarsenate anions all having nulceophilicity constants estimated to be less than about 2.

The accelerator portion may contain only the ionic accelerator compound or may comprise the ionic accelerator compound dissolved or suspended in a suitable vehicle. Preferred vehicles are water and lower alcohols (e.g., ethanol and isopropanol). A suitable amount of the ionic accelerator compound in a vehicle is between about 0.1 to 10% on a weight to weight basis.

In bonding substrates, the accelerator portion is applied to at least one of the substrates to be bonded. The adhesive base may then be applied to one or more of the substrates to which the accelerator portion has been applied. Alternatively, the adhesive base may be applied to any substrate or substrates which are to be bonded, but which have not been treated with the accelerator portion (provided, of course, that the accelerator portion has been applied to at least one substrate to be bonded). In the event that the adhesive base and accelerator portion are applied to the same substrate one should proceed quickly with the bonding operation.

It has been found in the present invention that the accelerator portion may be preapplied to substrates well in advance of the time that the substrates are to be bonded. In particular, it has been found that the bonding operation may be performed up to about 24 hours after the accelerator portion has been applied to a substrate.

It is to be understood that the adhesive compositions desribed herein may be employed in bonding operations involving substrates other than wood (e.g., metal, glass and plastics).

The following non-limiting examples will illustrate the practice of the invention. Unless otherwise indicated, all parts, proportions and percentages are by weight.

TESTING PROCEDURES

Overlap Shear Strength Determination Test

Test Method A

The bonding performance of an adhesive composition is determined as follows. Maple wood (i.e., as used in the specification and claims, "maple wood" designates hard maple wood, 1st/2nd grade) substrates measuring 1"×4"×5/16" (2.5 cm×10 cm×0.8 cm) are equilibrated at 77° F. and 50% Relative Humidity. About 75 mg of an adhesive base is applied to one of such maple wood substrates as a continuous coating. An accelerator portion, which comprises an accelerator compound dissolved in water, ethanol or a mixture of ethanol and water to give a concentration with respect to the accelerator compound of 0.07 molal, is brushed onto a second maple wood substrate as a continuous light coating. Warming of the solution may be necessary to achieve dissolution of the accelerator compound. Application of the accelerator portion to the second maple wood substrate is accompanied by forced air drying (e.g., such as is provided by a fan or exhaust hood) in order to assure complete removal of visible solvent of the accelerator portion from the surface of the substrate. Some of the solvent, or course, will be removed through absorbtion into the maple wood substrate. Complete removal of visible solvent is desired (prior to bringing the substrates into abutting relationship) in order to avoid adversely affecting bonding performance. After an open time (i.e., the time elapsed between application of the accelerator portion to a maple wood substrate and placing of the maple wood substrates in an abutting relationship) of 10 seconds, the two substrates are brought into abutting relationship with one another to form an adhesive bond having a one-square-inch (6.25 cm²) overlap. The bond is aged at 24 hours at room temperature. Alternatively, the bond is aged 24 hours at room temperature and subsequently for an additional 72 days in an environment maintained at 160° F. (70° C.) and 100% Relative Humidity. After aging of the bond, the overlap shear value (given in pounds per square inch) is determined at room temperature using a Dynamic Tester operated at a jaw separation rate of 2 inches per minute. Results given below represent the average of at least 3 independent determinations. This Test Method A is the method to be used in determining the overlap shear values stated in the instant specification. This Test Method A is also the method to be used in determining the overlap shear values stated in the instant claims. The overlap shear values stated in the claims represent overlap shear values after aging the bond sequentially at room temperature and then at 160° F. and 100% Relative Humidity as described in this Test Method A.

Set-Time Determination

Test Method B

Maple wood substrates as described in Test Method A and as conditioned as described in Test Method A are treated with an adhesive base and an accelerator portion in the manner described in Test Method A. After a 10 second open time, the substrates are brought into an abutting relationship so as to allow bond formation. Strength of the bond is tested at increasing increments of time (i.e., 10, 15, 20, etc., seconds). The set-time is determined to be the time at which the bond is difficult to break with moderate hand strength. This Test Method B is the method to be used in determining the set time values stated in the instant specification and claims.

EXAMPLES 1–25

Suitable adhesive compositions in accordance with the present invention comprise an adhesive base and accelerator portions described as follows. The adhesive base consists of "CA-5" (a cyanoacrylate composition comprising ethyl cyanoacrylate, a thickener, and sulfur dioxide, commercially available from 3M). The accelerator portion comprises an ionic accelerator compound (appearing in Table III below) dissolved in a 50:50 (weight/weight) mixture of ethanol and water to give a concentration with respect to the accelerator compound of 0.07 molal.

Table III includes the overlap shear strength exhibited by the cured compositions when determined after aging 24 hours at room temperature in accordance with Test Method A, the overlap shear strength exhibited by the cured compositions when determined after aging 72 days in an environment maintained at 100% relative humidity and 160° F. (after first aging the cured composition 24 hours at room temperature) in accordance with Test Method A, and the set-time of the compositions as determined in accordance with Test Method B. Table III also includes the results observed when no accelerator portion was employed with the adhesive base of Examples 1–25.

TABLE III

| | | pKa | | Overlap Shear Value (pounds per square inch) | | Set Time (seconds) |
|---|---|---|---|---|---|---|
| Example | Ionic Accelerator Compound | cation | anion | Aged 24 hours at Room Temperature | Aged 72 hours at 100% Relative Humidity and 160° F. | |
| 1 | Potassium triflate (CF$_3$SO$_3$K) | 14.5$^a$ | <−5$^d$ | 1050 | 650 | 20 |
| 2 | Potassium perchlorate (KClO$_4$) | 14.5$^a$ | <−5$^d$ | 700 | 690 | 40 |
| 3 | Potassium bromide (KBr) | 14.5$^a$ | −9$^b$ | 1220 | 680 | <15, 40 |
| 4 | Potassium chloride (KCl) | 14.5$^a$ | −6$^b$ | 850 | 690 | <15 |
| 5 | Potassium thiocyanate (KSCN) | 14.5$^a$ | −1.9$^b$ | 640 | 530 | 5 |
| 6 | Sodium hexafluoroantimonate (NaSbF$_6$) | 14.2$^a$ | <−5$^d$ | 950 | 570 | <15 |
| 7 | Sodium periodate (NaIO$_4$) | 14.2$^a$ | <−5$^d$ | 920 | 580 | 10 |
| 8 | Sodium triflate (CF$_3$SO$_3$Na) | 14.2$^a$ | <−5$^d$ | 775 | 530 | <15 |
| 9 | Sodium tetrafluoroborate (NaBF$_4$) | 14.2$^a$ | <−5$^d$ | 800 | 600 | <15 |
| 10 | Sodium bromide (NaBr) | 14.2$^a$ | −9$^b$ | 800 | 660 | <15 |
| 11 | Sodium chloride (NaCl) | 14.2$^a$ | −6$^b$ | 730 | 580 | <15 |
| 12 | Sodium-methyl phenyl sulfonate (p-CH$_3$φSO$_3$Na) | 14.2$^a$ | −1.0$^b$ | 740 | 730 | 15 |
| 13 | Sodium trifluoroacetate (CF$_3$CO$_2$Na) | 14.2$^a$ | −0.3$^b$ | 820 | 480 | 10 |
| 14 | Sodium nitrate (NaNO$_3$) | 14.2$^a$ | −1.3$^c$ | 755 | 700 | <15 |
| 15 | Cesium bromide (CsBr) | >13$^d$ | −9$^b$ | 900 | 600 | <15 |
| 16 | Lithium triflate (CF$_3$SO$_3$Li) | 13.6$^a$ | <−5$^d$ | 790 | 780 | 50 |
| 17 | Lithium bromide (LiBr) | 13.6$^a$ | −9$^b$ | 1200 | 800 | <15 |
| 18 | Calcium triflate (CF$_3$SO$_3$Ca) | 12.9$^a$ | <−5$^d$ | 880 | 800 | |
| 19 | Magnesium bromide (MgBr$_2$) | 11.4$^a$ | −9$^b$ | 650 | 610 | 25 |
| 20 | Manganese triflate ((CF$_3$SO$_3$)$_2$Mn) | 10.6$^a$ | <−5$^d$ | 520 | 750 | 25 |
| 21 | Tetramethyl ammonium triflate | >13$^d$ | <−5$^d$ | 850 | 750 | <15 |
| 22 | Tetramethyl ammonium perchlorate | >13$^d$ | −10$^b$ | 965 | 790 | <15 |
| 23 | Tetrabutyl ammonium perchlorate | >13$^d$ | −10$^b$ | 1210 | 520 | <15, 50 |
| 24 | Tetramethyl ammonium bromide | >13$^d$ | −9$^b$ | 1150 | 510 | <15 |
| 25 | Tetramethyl ammonium chloride | >13$^d$ | −6$^b$ | 830 | 750 | <15 |
| Control | None | | | 1300 | 790 | >200 |

$^a$The Hydrolysis of Cations, C. F. Base Jr. and R. E. Mesmer, John Wiley and Sons, 1976.
$^b$Lange's Handbook of Chemistry, 12th Ed., McGraw-Hill, Table 5-7.
$^c$R. G. Pearson et al, J. Am. Chem. Soc. 90, 319 (1968).
$^d$Estimate.

As indicated in Table III, the adhesive compositions of Examples 1–25 set within about 50 seconds or less and, when employed using a 10 second open time (relative to the accelerator portion), provided bonds which aged suitably under conditions of elevated temperature and high humidity. While the adhesive composition which did not comprise an accelerator portion provided a bond which aged suitably under conditions of elevated temperature and high humidity, that adhesive composition exhibited a prolonged set time of greater than 200 seconds.

The adhesive compositions of the present invention should exhibit a set time (as determined as described herein) which is less than about ⅓, and preferably less than about 1/6, that exhibited by an adhesive composition comprising only an adhesive base and no accelerator compound. The most preferred adhesive compositions of the present invention exhibit a set time which is less than about 1/10 that exhibited by an adhesive composition comprising only an adhesive base and no accelerator compound.

EXAMPLE 26

By way of comparison, adhesive compositions were prepared which comprised the adhesive base of Examples 1-25 and accelerator portions consisting of an accelerator compound (appearing in Table IV below and not falling within the scope of the present invention) dissolved in the same vehicle and in the same concentration as described in Test Method A. Table IV includes results of the same determinations as reported in Table III of Examples 1-25. Table IV also includes the results observed when no accelerator portion was employed with the adhesive base.

TABLE IV

| | pKa | | Nucleophilicity | Overlap Shear Value (pounds per square inch) | | Set Time (seconds) |
| Accelerator Compound | cation | anion | constant | Aged 24 Hours at Room Temperature | Aged 72 Hours at 100% Relative Humidity and 160° F. | |
|---|---|---|---|---|---|---|
| Sodium hydroxide (NaOH) | 14.2[a] | >13[c] | | 0 | 0 | 10 |
| Sodium sulfide (Na$_2$S) | 14.2[a] | 12.9[b] | | 0 | 0 | <15 |
| Sodium carbonate (Na$_2$CO$_3$) | 14.2[a] | 10.3[b] | | 0 | 0 | <15 |
| Tetrabutyl ammonium hydroxide | >13 | >13[c] | | 0 | 0 | <15 |
| Tetrabutyl ammonium iodide | >13 | −9.5[b] | 7.42[d] | 600 | 200 | <20 |
| Tetrabutyl ammonium bromide | >13 | −9.0[b] | 5.79[d] | 820 | 340 | <15 |
| N—N—dimethyl-p-toluidine | | | | 585 | 460 | <10 |
| None | | | | 1300 | 790 | >200 |

[a]The Hydrolysis of Cations, ibid.
[b]Lange's Handbook of Chemistry, ibid.
[c]Estimate.
[d]R. G. Pearson et al. J. Am. Chem. Soc. 90, 319 (1968).

As indicated in Table IV, the adhesive compositions comprising strongly basic ionic accelerator compounds (i.e., sodium hydroxide, sodium sulfide, sodium carbonate or tetrabutyl ammonium hydroxide), while setting rapidly, provided essentially no adhesive bond when employed with a 10 second open time. The adhesive compositions comprising ammonium iodide or tetrabutyl ammonium bromide (these ionic accelerator compounds not being within the scope of the present invention due to the nucleophilicity constant of iodide and bromide anions) set rapidly, but did not perform as well as the adhesive compositions of the present invention when employed with a 10 second open time. The results for an adhesive composition comprising the covalent organic base N-N-dimethyl-p-toluidine as the accelerator compound are also included in Table IV.

What is claimed is:

1. A two-part adhesive composition comprising an adhesive base as the first part and an accelerator portion as the second part, said adhesive base comprising (a) a polymerizable monomer of the formula $$CH_2=C(CN)COOR^1$$

wherein $R^1$ is selected from the group consisting of an alkyl group of 1 to about 10 carbon atoms and an alkenyl group of 2 to about 10 carbon atoms; and (b) a stabilizer selected from the group consisting of an anionic polymerization inhibitor and a free-radical polymerization inhibitor, said stabilizer being present in an amount such that said adhesive base exhibits substantially no gelation when stored for at least about one month at 22° C., and said accelerator portion comprising a weakly acidic or weakly basic ionic accelerator compound comprising a cation M and an anion A, the pKa relating to said cation M in the equilibrium defined by $$M(H_2O)^+ \rightleftharpoons MOH + H^+$$

being at least about 10, the pKa relating to said anion A in the equilibrium defined by $$HA \rightleftharpoons A^- + H^+$$

being less than or equal to about 0, and the nucleophilicity constant of anion A being less than about 2 when cation M is an onium cation comprising more than 8 carbons, said nucleophilicity constant being determined relative to methyl iodide; said adhesive composition being further characterized in that it exhibits a set time of less than ⅓ that of said adhesive base alone and provides a bond which exhibits an overlap shear strength of at least about 400 pounds per square inch on maple wood.

2. An adhesive composition in accordance with claim 1, wherein said unsubstituted alpha-cyanoacrylate is selected from the group consisting of methyl alpha-cyanacrylate, ethyl alpha-cyanonacrylate, n-propyl alpha-cyanoacrylate, isopropyl alpha-cyanoacrylate, n-butyl alpha-cyanoacrylate isobutyl alpha-cyanoacrylate, allyl alpha-cyanoacrylate and ethyl alpha-cyanoacrylate.

3. An adhesive composition in accordance with claim 1, wherein said stabilizer is selected from the group consisting of anionic polymerization inhibitors and free-radical polymerization inhibitors.

4. An adhesive composition in accordance with claim 1, wherein said pKa relating to said cation M is at least about 13 and said pKa relating to said anion A is less than or equal to about −5.

5. An adhesive composition in accordance with claim 1, wherein said cation M is selected from the group consisting of Cs$^+$, K$^+$, Na$^+$, Li$^+$, Ba$^{++}$, Ca$^{++}$, Mg$^{++}$ and Mn$^{++}$, and wherein said anion A is selected from the group consisting of ClO$_4^-$, I$^-$, Br$^-$, Cl$^-$, ClO$_3^-$, SCN$^-$, $\phi$SO$_3^-$, CH$_3\phi$SO$_3^-$, CH$_3$SO$_3^-$, CF$_3$CO$_2^-$, NO$_3^-$, BF$_4^-$, IO$_4^-$, CF$_3$SO$_3^-$, PF$_6^-$, SbF$_6^-$, and AsF$_6^-$.

6. An adhesive composition in accordance with claim 1, wherein said cation M is a quaternary ammonium cation and said anion A is selected from the group consisting of ClO$_4^-$, I$^-$, Br$^-$, Cl$^-$, ClO$_3^-$, SCN$^-$, $\phi$SO$_3^-$, CH$_3\phi$SO$_3^-$, CH$_3$SO$_3^-$, CF$_3$CO$_2^-$, NO$_3^-$, BF$_4^-$, IO$_4^-$, CF$_3$SO$_3^-$, PF$_6^-$, SbF$_6^-$, and AsF$_6^-$.

7. An adhesive composition in accordance with claim 4, wherein said cation M is selected from the group consisting of K+, Na+, Cs+, Li+, Ba++, and quaternary ammonium cations comprising no more than 8 carbons, and said anion A is selected from the group consisting of $ClO_4^-$, $I^-$, $Br^-$, $Cl^-$, $BF_4^-$, $IO_4^-$, $CF_3SO_3^-$, $PF_6^-$, $SbF_6^-$, and $AsF_6^-$.

8. An adhesive composition in accordance with claim 4, wherein said weakly acidic or weakly basic ionic accelerator compound is selected from the group consisting of tetramethyl ammonium perchlorate, tetramethyl ammonium bromide, tetramethyl ammonium triflate and potassium bromide.

9. An adhesive composition in accordance with claim 1, wherein said accelerator portion comprises said weakly acidic or weakly basic ionic accelerator compound dissolved in a suitable vehicle.

10. An adhesive composition in accordance with claim 9, wherein said vehicle is selected from the group consisting of water, ethanol and isopropanol.

11. An adhesive composition in accordance with claim 10, wherein the amount of said weakly acidic or weakly basic acidic ionic accelerator compound in said vehicle is about 0.1 to 10% by weight.

* * * * *